United States Patent [19]
Valente

[11] 3,789,489
[45] Feb. 5, 1974

[54] APPARATUS FOR FABRICATING STRUCTURAL MEMBERS

[75] Inventor: Raymond L. Valente, Kankakee, Ill.

[73] Assignee: Manco Mfg. Co., Bradley, Ill.

[22] Filed: Sept. 12, 1972

[21] Appl. No.: 288,257

[52] U.S. Cl. ........... 29/208 C, 29/208 D, 29/200 P, 29/155
[51] Int. Cl............................................. B23p 19/04
[58] Field of Search 29/208 C, 208 D, 200 A, 155 R; 83/50

[56] References Cited
UNITED STATES PATENTS
3,712,161   1/1973   Valente.................................. 83/50

Primary Examiner—Thomas H. Eager
Attorney, Agent, or Firm—Roy H. Olson et al.

[57] ABSTRACT

A machine for effecting fabrication of a structural member including tool means, drive means for advancing the structural member longitudinally of a work station, and apparatus for properly positioning the tool means with respect to a predetermined location on the structural member at which tooling operations are to be performed. A gear rack and rotary gear cooperate on the downstream side of the drive means to operate an encoder which produces pulses corresponding to the longitudinal extent of travel of the structural member as it passes the work station. The output pulses from the encoder are delivered to a readout control which gives visual indication of the distance traveled in feet, inches and fractions of an inch. The probe means includes pivotal actuating means for arcuately swinging the probe out of the way to facilitate removal of the structural member from the conveying apparatus.

9 Claims, 6 Drawing Figures

Patented Feb. 5, 1974

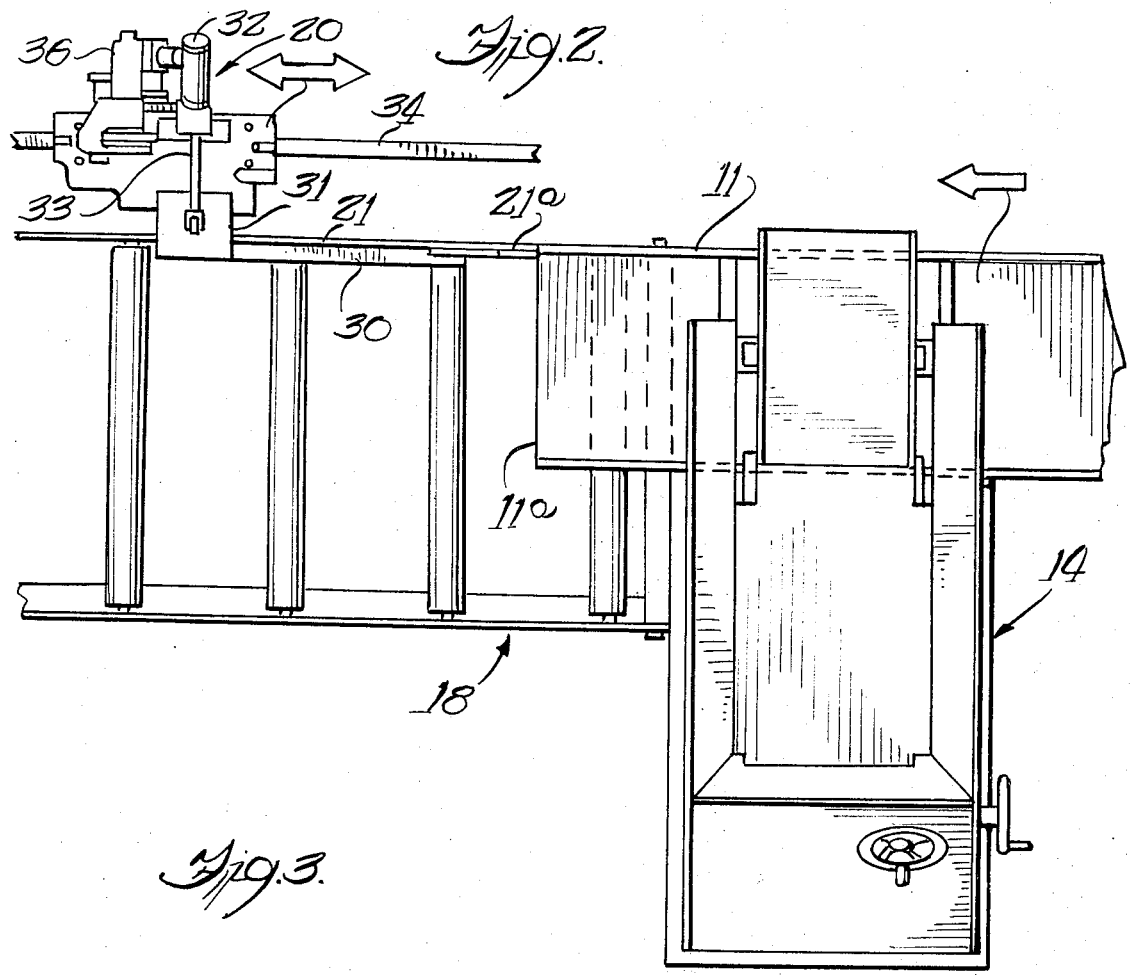
Fig. 2.
Fig. 3.
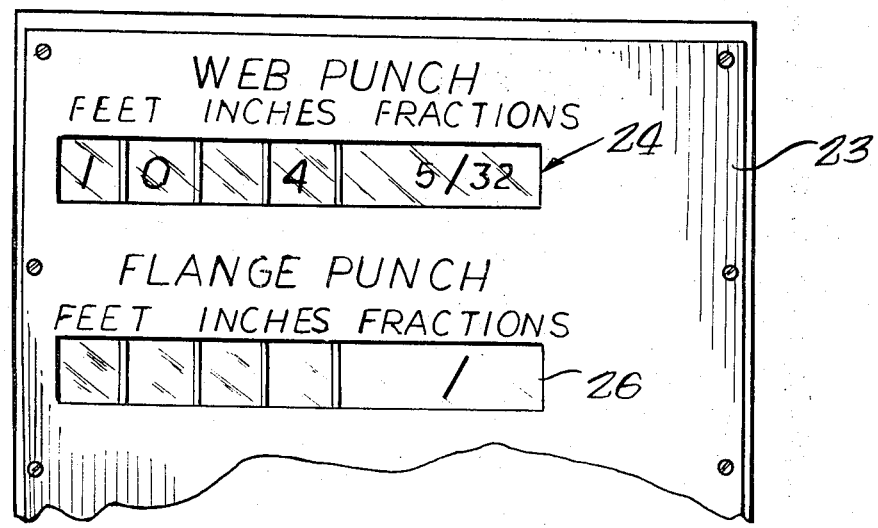

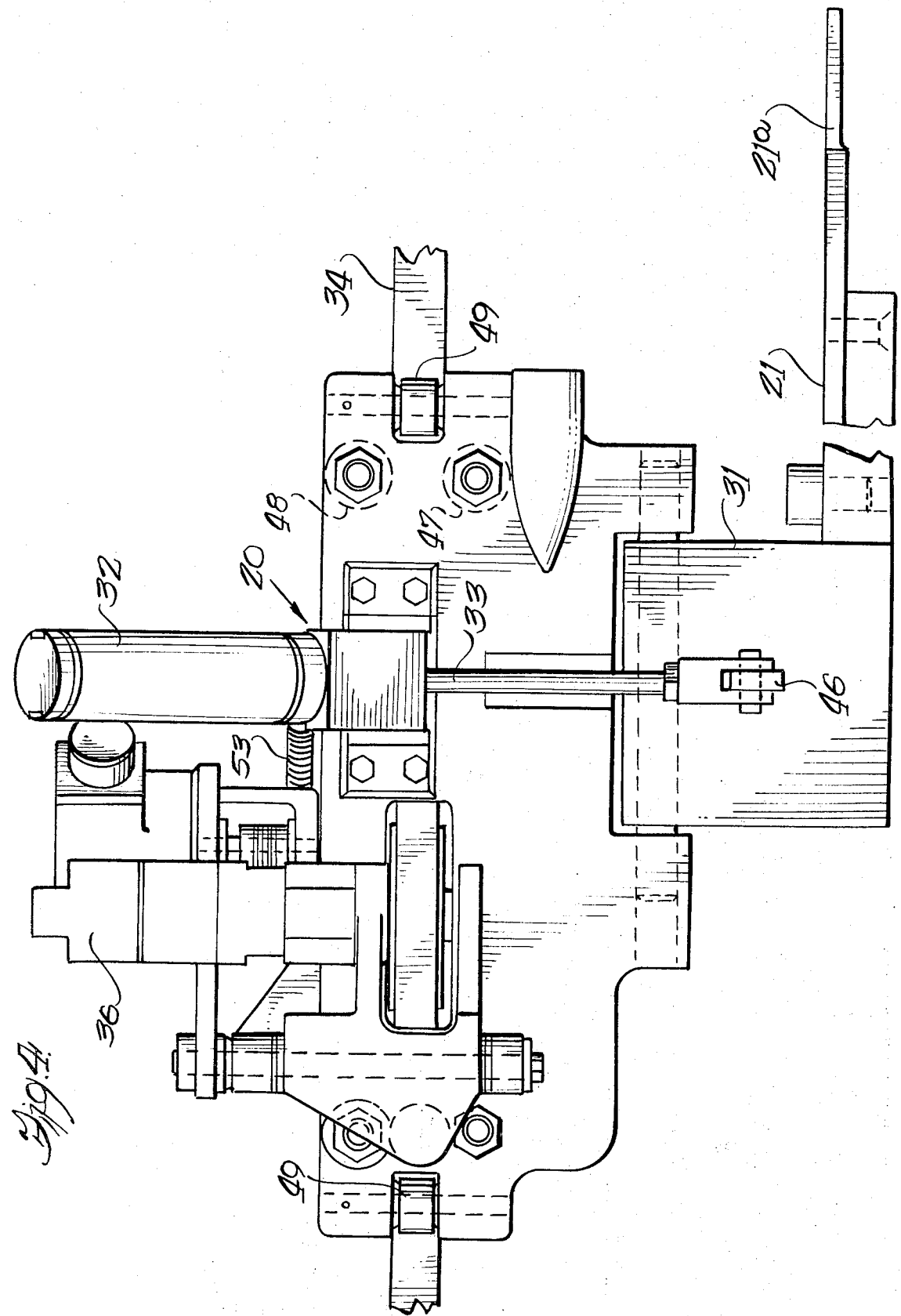

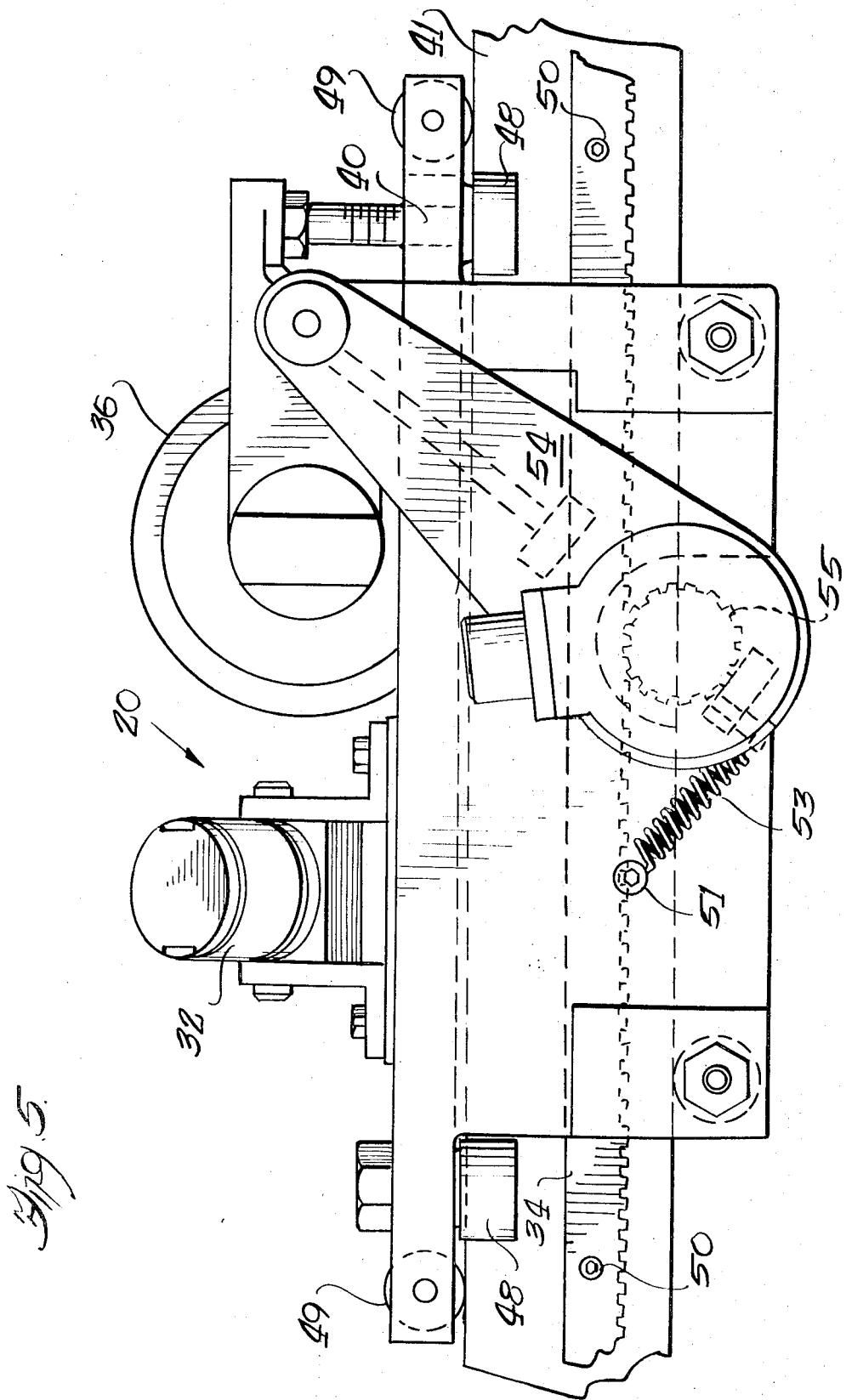

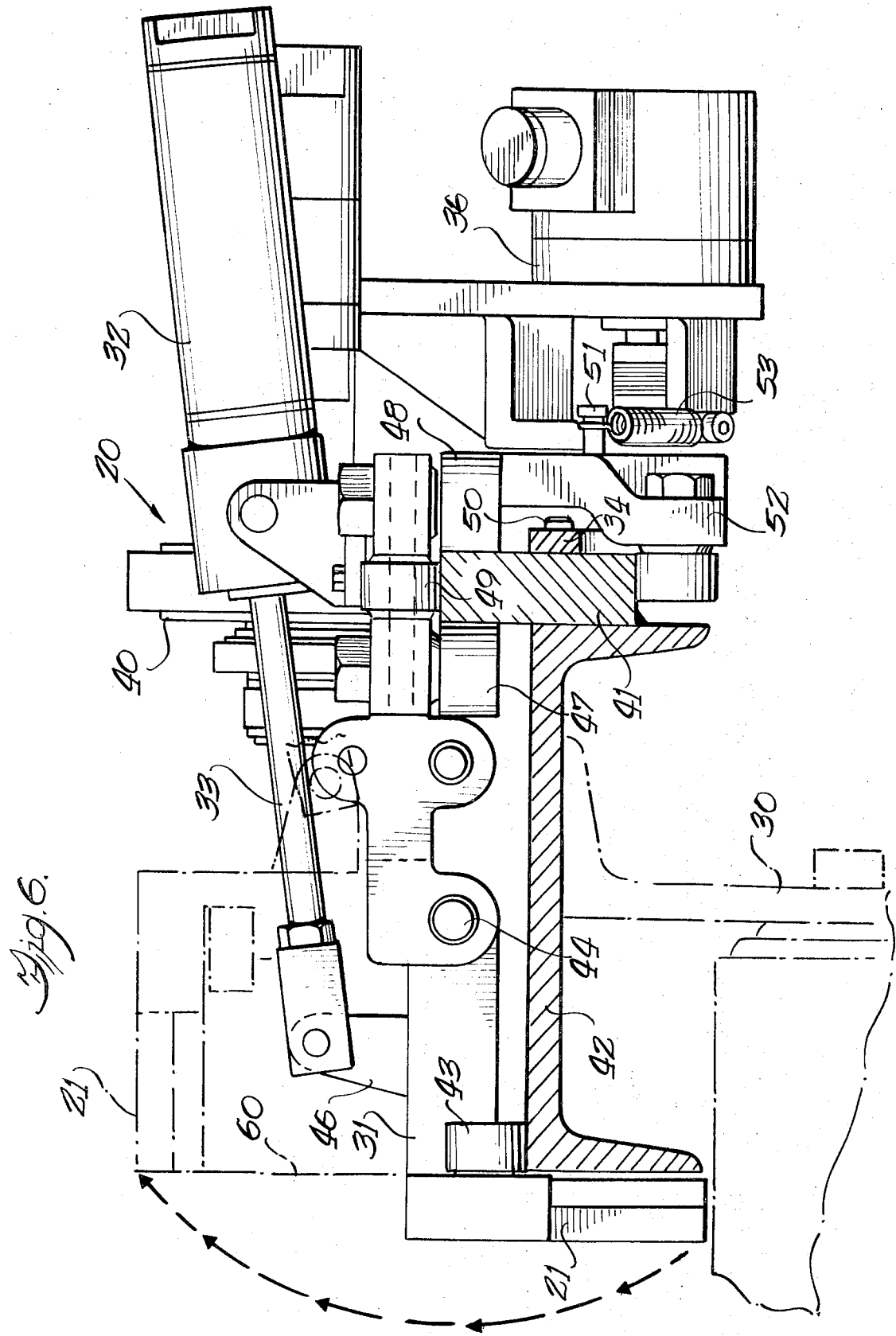

3,789,489

APPARATUS FOR FABRICATING STRUCTURAL MEMBERS

BACKGROUND OF THE INVENTION

This invention relates to apparatus for use in fabrication of elongated structural members, or workpieces, such as angle irons, channel irons, I-beams or the like. More particularly, the present invention provides novel apparatus for performing automatically a plurality of tooling operations at numerous locations spaced along the length of a structural member. Each of the locations along the length of a structural member are indicated on a readout which operates in response to signal information obtained from an encoder which is transported in unison with the travel of the structural member being operated on.

During the operation of forming holes or welding studs at specific locations on elongated structural members it is necessary to locate the precise points of operation so that it can be placed in registry with the appropriate tool means. Heretofore this has been generally accomplished by referring to a blueprint of the structural member and measuring the distances between the ends of the structural member or the distances between specific points therealong by the use of a tape measure or other conventional measurement instrument. This technique required that the operator continuously refer to the blueprint and make the measurements and provide locating marks on the structural member so that the mark could be placed in registry with the tool means. This required additional time for performing the various operations on the structural member.

SUMMARY OF THE INVENTION

Accordingly, it is an object of this invention to provide an improved machine for handling elongated structural members wherein the longitudinal dimensioning of the structural member as it passes the various work stations of the machine are automatically controlled.

Briefly, the direction of travel of the beam is referred to herein and throughout the claims as the X-axis while the transverse axis across the beam web is referred to as the Y-axis. As the beam is moved through the work station along conveying rollers the leading edge or leading end of the beam comes in registry with a fixed reference point in front of a given work station. An encoder is connected to the probe and travels along a gear rack such that a rotary gear connected to the encoder and engageable with the gear rack produces rotary movement of a pulse generator to produce 1,024 pulses per revolution of the gear. Each revolution of the gear corresponds to four inches of linear travel of the structural member thus providing 256 pulses per inch. When a beam is not engaged with the probe an air pressure system returns the carriage, which carries the encoder, to a home or zero position. A shock absorber is located at the home position and is used to reduce the effects of shock when the carriage stops. Just before the carriage reaches the home position, a limit switch is actuated and is positively operated when the carriage is in the home position. When the beam meets the extended probe of the carriage, the carriage is moved downline, or downstream, by movement of the beam at the same time the air pressure system is forcing the carriage against the beam to insure positive contact therewith while the encoder is producing pulses corresponding to the distance traveled of the beam. The instant the carriage leaves the home position at the work station, the associated counter and readout on a control panel begins to count up from a zero reference. This counter is calibrated in feet, inches and fractions of an inch. The limit switch is used to reset all the counters, but is not electrically effective when the carriage leaves the home position. Instead, the limit switch is actuated as the carriage returns to the home position and, a time reset of a signal or a pulse of approximately one second is used to zero the readout and hold the indicator at a zero reading until the carriage reaches its true mechanical home position. When the one second timer ends its timing cycle the entire system is reset. The beam can be moved away from the home position and the counter will record pulses from the encoder thus recording visual readout of the distance traveled of the beam in feet, inches and fractions of an inch.

Preferably there are three counters associated with the encoder to produce pulses corresponding to the three distinct portions of the structural member upon which tooling operations are to be performed. For example, an encoder is associated with a web punch mechanism for producing holes in a web, and two encoders are associated with each of the front and rear flange portions of the structural member so that different dimensioning of operations can be obtained at the different flanges. The readout means includes a different readout for each of the portions of the structural member.

Each of the readouts provide a numerical display of a maximum extent corresponding to 99 feet, 11 and 31/32 inches. The fractions readout displays the most simple fraction obtainable. For example, from a complex fraction of 16/32 the readout will display one-half inch.

Many other objects, features and advantages of this invention will be more fully realized and understood from the following detailed description when taken in conjunction with the accompanying drawings wherein like reference numerals throughout the various views of the drawings are intended to designate similar elements or components.

BRIEF DESCRIPTION OF THE DRAWINGS

FIG. 2 is a fragmentary top view of the machine of FIG. 1 showing only the flange punch work station and a portion of the transport conveyor upon which the distance measuring encoder of this invention is supported;

FIG. 3 is an enlarged fragmentary view of the readout means showing the distance traveled by a structural member, such distance being indicated in feet, inches and fractions of an inch;

FIG. 4 is an enlarged detailed top view of the mechanism carrying the encoder constructed in accordance with this invention;

FIG. 5 is a rear view of the mechanism of FIG. 4 showing the engagement of the encoder gear engageable with a longitudinal gear rack; and FIG. 6 is an end view of the mechanism of FIGS. 4 and 5 showing the tiltable function of the probe extending therefrom.

DETAILED DESCRIPTION OF THE ILLUSTRATED EMBODIMENT

Figure 1:
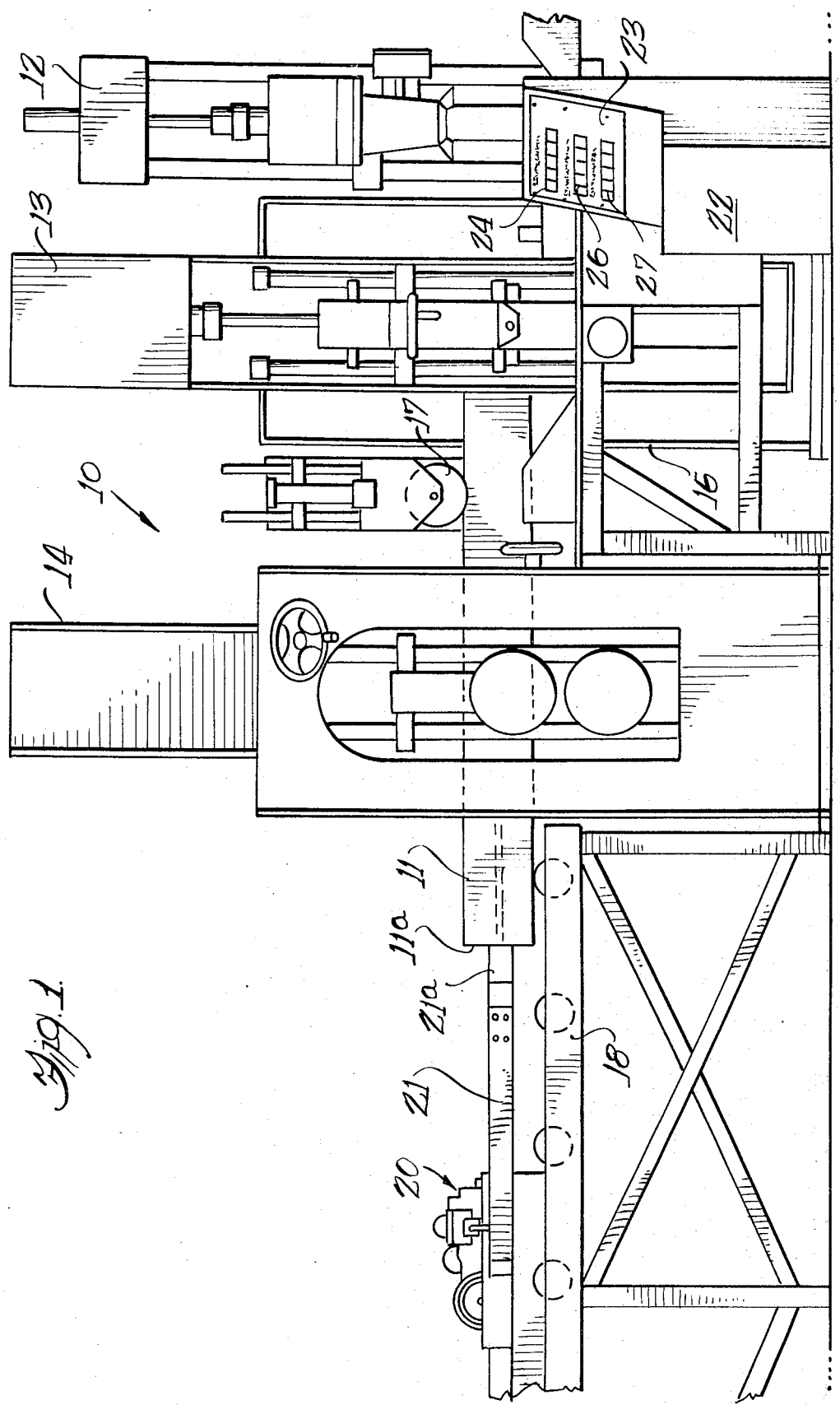
FIG. 1 is a front elevational view of a machine constructed in accordance with the principles of this invention.

Referring now to FIG. 1 there is seen a machine designed to perform various operations on elongated structural members and designated generally by reference numeral 10. The machine 10 includes a plurality of work stations at longitudinally spaced locations along a general work area, as shown on the drawings. For example, the first work station, to the right of the viewer, is a web punch mechanism which includes sufficient hydraulic and other control mechanisms necessary to form holes at precise locations in the web portion of a structural member 11. As illustrated, the structural member 11 is an I-beam, it being understood that other structural members such as channel beams or L-beams can be operated on with equal simplicity. The web punch 12 is positioned adjacent a rear flange punch 13 which has the punch mechanism thereof located on the far side of the conveyor to form holes in the rear flange. A second flange punch 14 is located on the front side of the conveyor to form holes in the front flange. By way of example, the web punch mechanism 12 and the flange punch mechanisms 13 and 14 have a one hundred ton press capacity. Also, the web punch mechanism 12 preferably may have a 1 and 3/4 inch stroke and a 1½ inch maximum hole diameter forming capability and a C-shaped punch holding structure with a 24 inch deep throat so that the large structural members, i.e. with a 24 inch web portion, can be operated upon. Similarly, the flange punches 13 and 14 have a 1 and ¾ inch stroke with a 1½ inch maximum hole diameter.

Positioned substantially centrally of the plurality of spaced apart work stations in a support table 16 upon which the structural member 11 is guided. A holddown guide roller 17 is positioned over the support table so that bouncing or lateral movement of the structural member is minimized during the punching operation. The structural member 11 is fed into the plurality of work stations by means of a transport mechanism, which may include a plurality of conveyor rollers motor driven and controlled in accordance with a speed selector mechanism associated with the apparatus. Also positioned at the output of the plurality of work stations, i.e. this being the downstream side of the machine, is another conveyor arrangement designated generally by reference numeral 18. The conveyor mechanism 18 has an outboard rail support upon which a distance measuring unit 20 is positioned for mutual movement with the structural member 11.

Preferably, the distance measuring unit 20 includes a probe 21 having an end portion 21a engageable with the leading end 11a of the structural member. The extent of the probe 21 is such that the end portion 21a engages the leading end 11a in the region of the work stations so that a zero reference location is obtained while the distance measuring unit is still securely located upon the outboard railing of the conveyor mechanism 18.

As the structural member is transported, to the left of FIG. 1, it also moves the distance measuring unit 20 along its support rail. Pulse signal information is produced from an encoder, to be described hereinbelow, and operates suitably circuitry associated with a control unit 22. The control unit 22 is positioned at a location in front of the various work stations to be convenient for the operator. The control unit 22 includes a readout panel 23 having suitable control switches and buttons located thereon and including a plurality of readout indicators 24 and 26. Other readout indicators may be associated therewith if desired. At the outset of operation of the apparatus 10 all of the readout indicators 24 and 26 will be blank with no numbers illuminated for visual display thereon. When the operator moves the beam to a home or initial starting position the readout display will be actuated when a limit switch is closed as the beam approaches the web punch mechanism 12. This will be the zero feet zero inches position. However, if the beam is already in position when the power is applied to the machine, the beam must be retracted from its position and then moved back to the zero home position. When the distance measuring unit 20 leaves the home position the web punch counter will start to register counts on the readout indicator 24 thus showing the distance of travel of the structural member past the web punch. If an aperture is to be formed in the web of the structural member at a given distance from its end, the transporting mechanism is stopped when the readout indicator registers this distance. The web punch mechanism is then actuated to produce the appropriate holes.

When the structural member 11 reaches a predetermined location in front of the rear flange punch mechanism 13 the other display readout indicator 26 will be illuminated to give a zero feet zero inches reading. As the beam moves beyond the rear flange punch station 13 the readout display will provide continuously changing readout of the distance traveled in increments of 1/32nd of an inch. The dimension between the home position of the rear flange punch station and the web punch station is the offset dimension, i.e. the difference between the two stations to obtain a zero readout at both readout indicators 24 and 26.

When the structural member reaches the exact location in front of the front flange station the front flange punch readout will light up, this being indicated by reference numeral 27 on the panel 23. The display of the front flange readout indicator is also zero feet and zero inches as the result of the automatic offset signal induced into the system. As the structural member 11 moves beyond the front flange work station the front flange display readout 27 will produce a continuously increasing readout of the movement as the structural member travels transversely, or in the X direction on the machine.

When the beam is returned toward the home station the front flange punch and the rear flange punch counters will count down and return to zero. Each of the associated illuminated display readouts 24, 26 and 27 will produce a blank condition when the leading end 11a of the structural member passes the zero reference point for each of the flange punch stations and at this time the readout will become blank. However, when the leading end 11a of the structural member 11 is at the home station in front of the web punch mechanism the readout associated therewith will be a zero reading.

When the counters are reset to zero a 1/64 inch count is preset into the counter. Upon reset, the web punch counter will display a zero dimension, but upon receiving an additional 1/64 inch pulse information from the encoder associated with the distance measuring unit 20 the counter will display 1/32 inch. Therefore, the counter is displaced 1/64 inches ahead of the true beam position. This allows the readout to be accurate to within plus or minus 1/64 of an inch of beam position. However, whenever a zero reference is used other than the home position located at the web punch station, and the beam is reversed to a counter reading of zero, the leading edge of the beam will be 1/64 of an inch upstream of the original starting point.

For a better understanding of the structural arrangement of the distance measuring unit 20, reference is now made to FIG. 2. The distance measuring unit 20 is positioned outboard of a rail 30 of the conveying apparatus 18 and includes a pivot support plate 31 upon which rests the probe 21. The pivot support plate 31 is connected to a hydraulic actuated cylinder 32 by means of a piston rod 33. The hydraulic actuated cylinder 32 is actuated upon sensing the end of travel of the structural member 11. This actuation pivotally raises the probe 21 out of engagement with the structural member so that the structural member can be conveyed to the end of the conveyor whereupon it is removed. The distance measuring unit 20 engages a gear rack 34 and has a rotary gear associated therewith engaging the rack for rotational movement of the gear upon linear movement of the unit. The rotary gear is connected to an encoder mechanism 36 which produces pulses in response to rotation of the gear. For example, there will be 1,024 pulses per revolution of the gear, and each revolution of the gear represents a linear movement of four inches of the structural member 11. Therefore, there are 256 pulses per inch of movement of the structural member, this providing a relatively fine readout with respect to the tolerable limits of the measurements made.

FIG. 3 more clearly illustrates the control panel 23 of the control unit 22. The readout indicators 24 and 26 are here shown for purposes of illustration. The first two windows of the readout panels represent the number of feet traveled, while the second two windows represent the number of inches traveled, and the last two windows, which are separated by a slant sign, indicate the fractions of inches traveled in increments of 32nds of an inch. Even increments of 32nds of an inch are rounded off to the largest obtainable fraction. For example, 16/32nds of an inch will be represented by one-half inch.

For a better understanding of the details of construction of the distance measuring unit 20, reference is now made to FIGS. 4, 5 and 6. Here the distance measuring unit is shown supported on a carriage assembly 40 which moves along a guide bar 41 extending along the conveying apparatus 18 in the direction of travel of the structural member. The guide bar 41 is secured to a support channel 42 which, in turn, is secured to the outboard rail 30 of the conveying apparatus, shown in broken lines in FIG. 6. The edge portion of the support 42 positioned over the conveying rollers forms an outboard roller track for a pivotal arm 31. The pivotal arm 31 includes a roller 43 near the extended end thereof and is secured to a boss member by means of a pivot pin 44. A bracket 46 extends upwardly from the plate 31 supporting the probe 21, this bracket being connected to the hydraulic actuator 32 by means of the piston rod 33. The carriage assembly 40 easily moves along the guide bar 41 as the result of a plurality of guide rollers 47, 48 and 49 located at both ends of the carriage.

The gear rack 34 is secured to the guide bar 41 by means of a plurality of socket head screws 50. A stud 51 extends from a depending arm 52 to have a tension spring 53 connected thereto. The tension spring 53 engages a pivotal arm 54 which, in turn, carries the gear 55 associated with the digital encoder 36. The spring 53 insures positive engagement of the gear teeth with the gear rack so that no backlash is encountered during forward and rearward movement of the distance measuring unit. This insures that no extraneous pulse signal information is produced during the travel of the unit.

As noted in FIG. 6 the probe 21 depends from the outboard edge of the support rail 42 and is in position to be in contact with the structural member being transported along the conveyor. However, as the probe 21 is raised, as the result of the pivotal action caused by the actuator 32, the end of the probe is pulled out of alignment with the path of travel of the structural member, this clearly being shown by the broken line 60 extending upwardly between the support rail 42 and the phantom showing of the probe. Therefore, the structural member can be transported further along the conveyor for removal therefrom by crane means or the like.

While only the specific details of construction necessary for a complete understanding of the invention have been clearly set forth herein, it can be seen from the drawings that other details are readily apparent without need of a specific description thereof. Accordingly, many other configurations and variations of this invention may be effected without departing from the spirit and scope of the novel concepts as set forth herein and as defined by the depending claims.

The invention is claimed as follows:

1. In a machine for use in a fabricating cycle wherein a plurality of tooling operations are performed on an elongated structural member, said operations being performed at one or more points along the longitudinal axis of the structural member, the combination including: transport means for conveying the structural member along a given path, work station means positioned in operative relation with said transport means to perform an operation on a structural member, probe means having one end thereof engageable with the leading end of the structural member as it moves past said work station means along said given path, signal generating means secured to the other end of said probe means for joint movement therewith, said signal generating means producing electrical signal information corresponding to the distance traveled by the structural member as it passes said work station means, readout means coupled to said signal generating means to indicate the distance traveled by said signal generating means which, in turn, indicates the distance traveled by the structural member past said work station, and control means coupled between said transport means and said readout means for controlling movement of the structural member along said given path and for stopping movement of the structural member at a precise location in registry with said work station means, whereby a fabricating operation can be performed on the structural member at a precise point along its longitudinal axis thereof.

2. In the machine as set forth in claim 1 said signal generating means includes an encoder for producing pulse signal information, said pulse signal information providing a given number of pulses for a given distance traveled.

3. In the machine as set forth in claim 2 including a gear rack secured to said transport means downstream of said work station means with respect to the direction of travel of the structural member, gear means engageable with said gear rack, said gear means being coupled to said encoder to provide a given number of pulses for each revolution of said gear means as it moves along said gear rack, and probe means extending outwardly and rearwardly from said encoder to be in the direct path of movement of the structural member, said probe means having the end thereof in direct contact with the leading end of the structural member as it travels along said transport means.

4. In the machine as set forth in claim 3 wherein said encoder produces 1,024 pulses per revolution of said gear and wherein each revolution of said gear is equivalent to four inches of linear travel of said structural member, thereby producing 256 pulses per inch of travel.

5. In the machine as set forth in claim 4 wherein said readout means provides a linear readout corresponding to the number of feet, inches, and fractions of an inch of travel of the structural member.

6. In the machine as set forth in claim 1 wherein said probe means is pivotally secured to said pulse generating means to allow swing-up action from a pivot point outboard of said transport means to allow the probe to be removed away from the path of travel of the structural member after it passes said work station means.

7. In the machine as set forth in claim 6 wherein said probe means is operated by a fluid actuator to provide said swing-up action.

8. In the machine as set forth in claim 1 wherein said work station means includes at least first and second work stations at different longitudinal positions with regard to the extent of travel of said structural member, said first work station including tool means for performing operations on a web portion of the structural member and said second work station including tool means for performing operations on flange portions of the structural member, and wherein said readout means includes at least first and second direct readout indicators, and said control means including zero reference setting means to allow a zero setting of said first and second direct readout indicators corresponding to the leading end position of the structural member as it passes a reference point at the respective work stations.

9. In the machine as set forth in claim 8 said readout means includes means for setting a predetermined offset dimension in said readout means so that the distance between said work stations can be varied while maintaining the zero reference reading of the direct readout indicators.

* * * * *